United States Patent
Brandin et al.

(10) Patent No.: US 9,619,432 B2
(45) Date of Patent: Apr. 11, 2017

(54) DRIVER ASSISTING SYSTEM AND METHOD WITH WINDSCREEN HEADS-UP DISPLAY OF VEHICLE ENVIRONMENT

(71) Applicant: VOLVO CAR CORPORATION, Goeteborg (SE)

(72) Inventors: Magnus Brandin, Moelnlycke (SE); Per Landfors, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/743,410

(22) Filed: Jan. 17, 2013

(65) Prior Publication Data
US 2013/0190944 A1 Jul. 25, 2013

(30) Foreign Application Priority Data
Jan. 19, 2012 (EP) .................................... 12151658

(51) Int. Cl.
*B62D 15/02* (2006.01)
*G06F 17/00* (2006.01)
(Continued)

(52) U.S. Cl.
CPC ......... *G06F 17/00* (2013.01); *B62D 15/0295* (2013.01); *G01C 21/26* (2013.01);
(Continued)

(58) Field of Classification Search
USPC .................. 701/300, 301, 302; 340/435, 905
See application file for complete search history.

(56) References Cited

U.S. PATENT DOCUMENTS

2003/0069695 A1* 4/2003 Imanishi et al. .............. 701/301
2005/0209763 A1 9/2005 Offerle et al.
(Continued)

FOREIGN PATENT DOCUMENTS

CN 101876751 A 11/2010
EP 1787849 A1 5/2007
(Continued)

OTHER PUBLICATIONS

European Patent Office, Partial European Search Report for corresponding European Patent Application No. EP 12 15 1658 mailed Jul. 2, 2012.
(Continued)

*Primary Examiner* — Jerrah Edwards
*Assistant Examiner* — Donald J Wallace
(74) *Attorney, Agent, or Firm* — Brooks Kushman P.C.

(57) ABSTRACT

A driver assisting system and method for a vehicle are provided. The system includes a processor and a display system. The display system is adapted to display information on a screen of a vehicle. The screen is adapted to show the environment in front of the vehicle or a representation thereof. The vehicle extends in a longitudinal direction and a lateral direction, the longitudinal direction corresponding to the intended direction of vehicle travel. The processor is adapted to receive a first input data signal indicative of a velocity of the vehicle, and a second input data signal indicative of an actual performed and/or on-going and/or impending lateral position change of the vehicle. The processor is further adapted to process at least the first and the second input data signals to calculate an estimated vehicle path, and the display system is adapted to display the estimated vehicle path on the screen.

20 Claims, 3 Drawing Sheets

(51) Int. Cl.
*G01C 21/26* (2006.01)
*B60W 50/14* (2012.01)
*B60W 30/095* (2012.01)

(52) U.S. Cl.
CPC ......... *B60W 30/0953* (2013.01); *B60W 50/14* (2013.01); *B60W 2050/143* (2013.01); *B60W 2050/146* (2013.01); *B60W 2420/42* (2013.01); *B60W 2520/10* (2013.01); *B60W 2520/12* (2013.01); *B60W 2550/14* (2013.01); *B60W 2550/146* (2013.01); *B60W 2550/148* (2013.01)

(56) References Cited

U.S. PATENT DOCUMENTS

| | | |
|---|---|---|
| 2005/0236896 A1 | 10/2005 | Offerle et al. |
| 2007/0139176 A1* | 6/2007 | Victor et al. .................. 340/435 |
| 2007/0191997 A1* | 8/2007 | Isaji et al. ........................ 701/1 |
| 2007/0294019 A1 | 12/2007 | Nishira et al. |
| 2009/0234552 A1* | 9/2009 | Takeda et al. ................... 701/96 |
| 2009/0319129 A1* | 12/2009 | Ghoneim ........................ 701/42 |
| 2010/0198474 A1* | 8/2010 | Shiiba et al. ..................... 701/70 |
| 2010/0253539 A1 | 10/2010 | Seder et al. |
| 2010/0253541 A1* | 10/2010 | Seder et al. ................... 340/905 |
| 2011/0098886 A1* | 4/2011 | Deng ............................. 701/301 |
| 2012/0169526 A1* | 7/2012 | Reilhac ............................ 342/70 |
| 2013/0226431 A1* | 8/2013 | Lu et al. .......................... 701/96 |

FOREIGN PATENT DOCUMENTS

| | | |
|---|---|---|
| JP | 2001315600 A | 11/2001 |
| JP | 2004101280 A | 2/2004 |
| JP | 2006160147 A | 6/2006 |
| JP | 2009012672 A | 1/2009 |
| JP | 2009083680 A | 4/2009 |
| JP | 2011230563 A | 11/2011 |
| WO | WO2011/035880 A1 * | 3/2011 |
| WO | 2011067170 A1 | 6/2011 |
| WO | 2011108091 A1 | 9/2011 |

OTHER PUBLICATIONS

M. Anderson, et al., Intelligent Vehicle Safety Systems, Road Friction Estimation, part II, IVSS Project Report, Reference No. 2004: 17750, Publication Date: Nov. 10, 2010, http://www.ivss.se/upload/ivss_refll_slutrapport.pdf (available at Jan. 12, 2012).

European Search Report and Opinion from corresponding European Application No. 12151658, dated Dec. 3, 2012.

Chinese Search Report and Office Action from corresponding Chinese Application No. 101876751, dated Nov. 25, 2015.

* cited by examiner

DRIVER ASSISTING SYSTEM AND METHOD WITH WINDSCREEN HEADS-UP DISPLAY OF VEHICLE ENVIRONMENT

CROSS-REFERENCE TO RELATED APPLICATIONS

This application claims foreign priority benefits under 35 U.S.C. §119(a)-(d) to European patent application number EP 12151658.7, filed Jan. 19, 2012, the disclosure of which is incorporated herein by reference in its entirety.

TECHNICAL FIELD

The present disclosure relates to a driver assisting system for a vehicle. The present disclosure further relates to a method of assisting a driver of a vehicle.

BACKGROUND

Vehicle accidents are a major worldwide problem. A large proportion of vehicle accidents are related to drivers not being aware of the consequences of vehicle behaviour. Several of these accidents are caused by a driver of a vehicle driving too fast under prevailing road conditions. Other accidents are caused by a driver not keeping enough distance to a vehicle in front to be able to brake and avoid an accident in case the vehicle in front decelerates rapidly. Also, many accidents are related to threats in front of the vehicle, such as pedestrians, animals, other vehicles, sharp curves, intersections, etc. Many of the accidents could be avoided if drivers had better understanding of vehicle behaviour and its consequences. Efforts have been made to provide information about the road conditions to a driver. In some systems, a single warning signal is presented e.g. in the form of a flashing symbol displayed in the instrument panel indicating that a traction control system is detecting that the vehicles tires are slipping. These systems do not fully help the driver to understand a critical situation and fail to warn the driver of an upcoming critical situation.

The document US 20100253539 A1 discloses a system utilizing vehicle-to-vehicle information for informing a driver of a vehicle about road condition. According to the document, when a vehicle approaches a particular stretch of road that has caused wheel slip for other vehicles, the system warns a driver of a vehicle equipped with such system about the road conditions. Thus, such system requires that a large number of vehicles driving in a particular area are equipped with such system if the system is to function as intended. Also, the system shown in the document does not provide crucial information to the driver about the vehicle behaviour.

The document WO 2011067170 A1 discloses a navigation device wherein a minimum appropriate distance to a vehicle ahead is displayed to a driver. When determining the minimum appropriate distance, information concerning the road condition may be taken into account. The navigation device shown in the document does not provide crucial information to the driver about vehicle behaviour.

Vehicles of today are getting more and more advanced. A driver of such vehicle is generally presented with more and more information. Thus, care must be taken not to overload a driver with information which could endanger the safety of driving. Hence, it has become crucial from a safety perspective to provide alerting systems which provide processed information, which can be intuitively perceived by the driver. Further, it is of great interest that the information provided may guide the driver to avoid a critical situation and how a certain driving behaviour affects the outcome in a driving situation.

Therefore, there is a need for a system and method that provides information to the driver about an upcoming critical situation.

SUMMARY

An object of the present disclosure is to increase the awareness of vehicle behaviour and its consequences to a driver of the vehicle.

According to an aspect of the disclosure, the object is achieved by a driver assisting system for a vehicle, wherein the system comprises a processing means and a display means. The display means is adapted to display information on a screen of a vehicle hosting the system, and the screen further being adapted to show the environment in front of the vehicle, and/or a representation of the environment in front of the vehicle. The vehicle extends in a longitudinal direction and a lateral direction, and wherein the longitudinal direction corresponds to the intended direction of travel of the vehicle. The processing means is adapted to receive:

a first input data signal indicative of a velocity of the vehicle hosting the system, and a second input data signal indicative of an actual performed and/or on-going and/or impending lateral position change of the vehicle hosting the system.

The processing means further being adapted to process at least the first and the second input data signals to thereby calculate an estimated vehicle path of the vehicle hosting the system. The display means is adapted to display the estimated vehicle path on the screen.

Since an estimated vehicle path is presented to a driver via the display means, the driver's awareness of vehicle behaviour and its consequences is increased. As a result, the above mentioned object is achieved.

The vehicle may be an automotive vehicle, such as an automobile, a bus, or a truck.

According to some embodiments, the processing means comprises a processing unit, e.g. a processor. The processing means may comprise two or more processing units, e.g. processors.

According to some embodiments, the screen is a windscreen of the vehicle hosting the system. In such embodiments, the windscreen shows the environment in front of the vehicle. The windscreen may form part of a head up display system, wherein the display means is adapted to display information on the windscreen. The windscreen may be provided with a coating material and/or light emitting particles and/or microstructures over a predefined region of the windscreen permitting display of information upon the windscreen, while permitting vision through the windscreen. In such embodiments, the display means may be a projector used to project information upon the windscreen. The displaying of the estimated vehicle path by the display means may be made such that the driver perceives that the displaying is made on the road in front of the vehicle. The projector may project invisible, or less visible, radiation to the windscreen wherein coating material and/or light emitting particles and/or microstructures is fluorescent such that invisible, or less visible, radiation is converted into visible light.

According to some embodiments, the screen is a screen positioned between the driver of the vehicle and the windscreen, wherein the screen forms part of a head up display system. In such embodiments, the display means is adapted to display information on the screen, while permitting vision through the screen. Also in these embodiments, the display means may comprise a projector used to project information upon the screen. The projector may project invisible (or less visible) radiation to the screen wherein coating material and/or light emitting particles and/or microstructures of the screen may be fluorescent such that invisible (or less visible) radiation is converted into visible light.

According to some embodiments, the display means comprises a screen showing an image of the road in front of the vehicle captured by a camera. In such embodiments, the camera may form part of a camera system and/or an imaging system device capable of capturing a digital image representation of the environment in front of the vehicle that is displayed on the screen. The camera may be a camera capable of capturing an image of visible light and/or a camera capable of capturing an image of invisible light, such as an infrared camera. The camera system may comprise one or more cameras. The displaying of the estimated vehicle path may be made such that the estimated vehicle path is projected upon the camera image of the road in front of the vehicle on the screen to give the impression that the projection is made on the road. Thus, according to such embodiments, the driver may easily perceive information concerning vehicle behaviour.

According to some embodiments, the display means comprises a screen showing a navigation image of the road in front of the vehicle. In such embodiments, the screen may form a part of a navigation system utilizing a global positioning system (GPS). The screen may be a head up display or a LED screen or a LCD screen or any other screen capable of showing a navigation image. The feature "a navigation image of the road in front of the vehicle" encompasses a navigation image of the road in an area around the vehicle including a portion of the road in front of the vehicle. Further, the display means may be a screen adapted to show a navigation image of an area remote from the vehicle, e.g. upon request from the driver. The displaying of the estimated vehicle path may be made such that the estimated vehicle path is projected upon the navigation image of the road in front of the vehicle.

According to an aspect of the disclosure, the object is achieved by a method of assisting a driver of a vehicle using a processing means and a display means. The display means is adapted to display information on a screen of a vehicle hosting the system, the screen further being adapted to present the environment in front of the vehicle, and/or a representation of the environment in front of the vehicle. The vehicle extends in a longitudinal direction and a lateral direction, wherein the longitudinal direction corresponds to the intended direction of travel of the vehicle. The method comprises;

receiving in the processing means a first input data signal indicative of a velocity of the vehicle hosting the system, and receiving in the processing means a second input data signal indicative of an actual performed and/or on-going and/or impending lateral position change of the vehicle hosting the system, and processing at least the first and the second input data signals, using the processing means, to thereby calculate an estimated vehicle path of the vehicle hosting the system, and displaying the estimated vehicle path on the screen using the display means.

Again, since an estimated vehicle path is presented to a driver via the display means, the driver's awareness of vehicle behaviour and its consequences is increased. As a result, the above mentioned object is achieved.

Further features of, and advantages with, the present disclosure will become apparent when studying the appended claims and the following detailed description. Those skilled in the art will realize that different features of the present disclosure may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

The present disclosure will now be described more fully with reference to the accompanying drawings, in which example embodiments are shown. However, this disclosure should not be construed as limited to the embodiments set forth herein. Disclosed features of example embodiments may be combined as readily understood by one of ordinary skill in the art to which this disclosure belongs. Like numbers refer to like elements throughout.

Well-known functions or constructions will not necessarily be described in detail for brevity and/or clarity.

Figure 1:
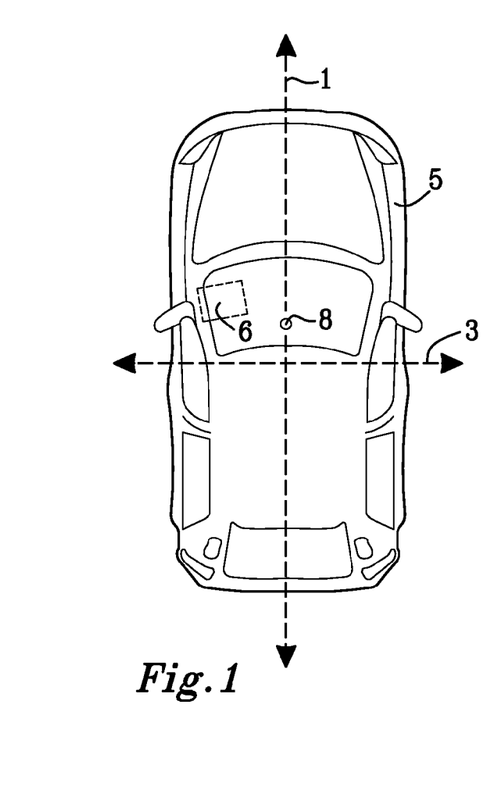
FIG. 1 illustrates a vehicle comprising a driver assisting system according to some embodiments.

FIG. 1 illustrates a vehicle 5 comprising a driver assisting system 6 according to some embodiments. The vehicle 5 extends in a longitudinal direction 1 and a lateral direction 3. The longitudinal direction 1 corresponds to an intended direction of travel of the vehicle 5. That is, the longitudinal direction 1 coincides with a direction of travel when the vehicle 5 is travelling in a straight line. When the vehicle 5 is turning, the longitudinal direction 1 is perpendicular to a turning radius of the vehicle 5. The lateral direction 3 is perpendicular to the longitudinal direction 1. The vehicle 5 may comprise a camera 8 arranged to capture an image of the environment in front of the vehicle 5.

Figure 2:
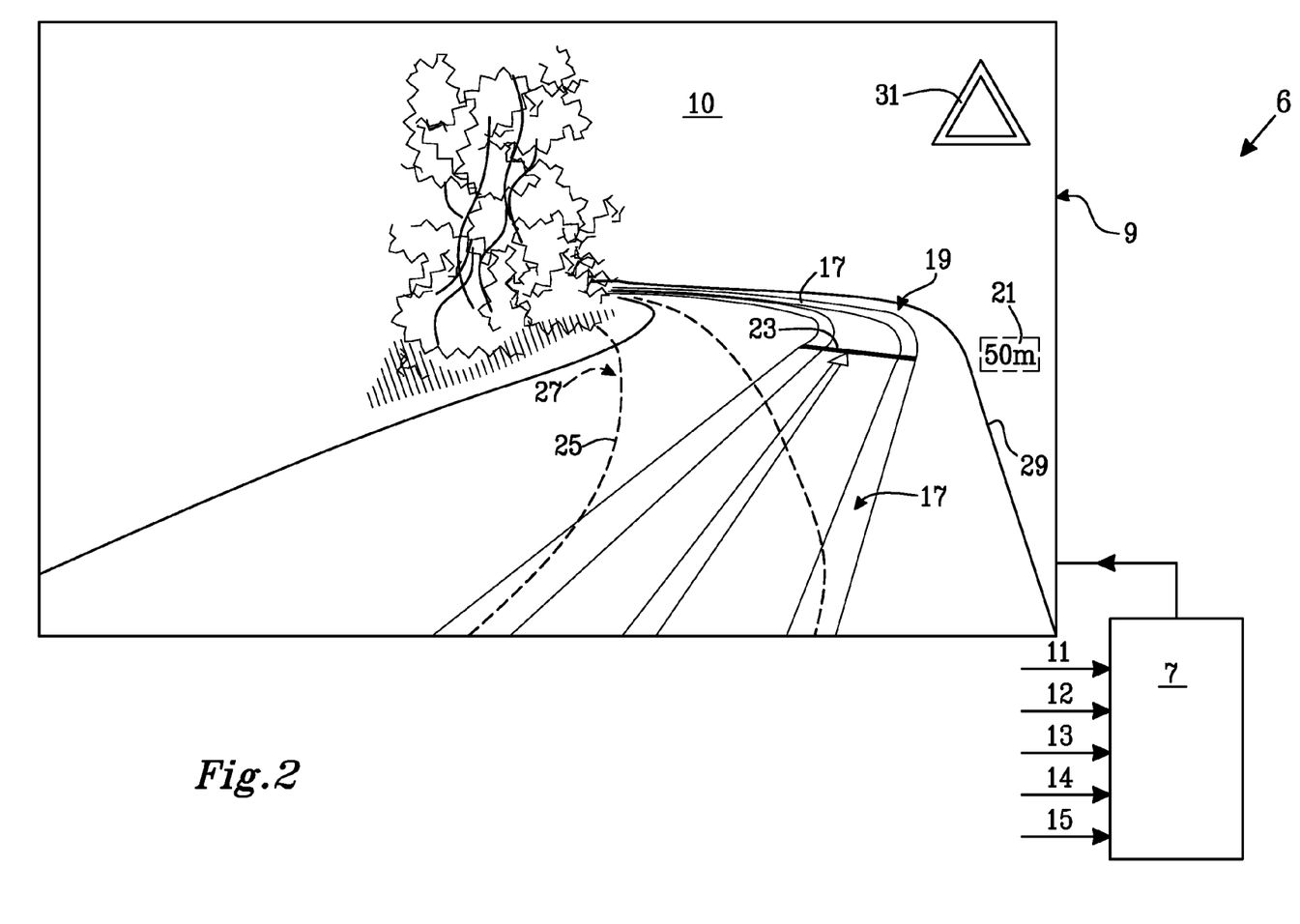
FIG. 2 illustrates a driver assisting system for a vehicle according to some embodiments.

FIG. 2 illustrates a driver assisting system 6 for a vehicle according to some embodiments. The system 6 comprises a processing means 7 and a display system or means 9. The display means 9 is adapted to display information on a screen 10 of the vehicle hosting the system 6. The screen 10 is adapted to show the environment in front of the vehicle, and/or a representation of the environment in front of the vehicle. The processing means 7 is adapted to receive a first input data signal 11 indicative of a velocity of the vehicle hosting the system 6 and a second input data signal 12 indicative of an actual performed and/or on-going and/or impending lateral position change of the vehicle hosting the system 6. The processing means 7 is adapted to process at least the first and the second input data signals 11, 12 to thereby calculate an estimated vehicle path 17 of the vehicle hosting the system 6. The display means 9 is adapted to display the estimated vehicle path 17 on the screen 10. The screen may be a windscreen 10 of the vehicle hosting the system 6 or a screen 10 showing an image of the road in front of the vehicle captured by a camera or a screen 10 showing a navigation image of the road in front of the vehicle. The displaying of the estimated vehicle path 17 may be made such that the driver apprehends that the displaying is made upon the road in front of the vehicle.

The first input data signal 11 may be provided by sensor device (not shown in FIG. 2). The sensor device may be a rate of rotation sensor device arranged to measure a rate of rotation of a rotatable part of the vehicle, such as a part of a transmission or a wheel of the vehicle. Further, the sensor device may be a GPS system or any other device capable of providing a first input data signal 11 indicative of a velocity of the vehicle, such as a distance meter. The first input data signal 11 may be provided by a combination of input data signals indicative of the velocity of the vehicle that may be provided by two or more sensor devices.

Further, the second input data signal 12 may be provided by a sensor device, such as a steering angle sensor device. In such embodiments, the steering angle sensor device may be arranged to measure a steering angle or an angular displacement of the steering angle of the vehicle by means of a sensor arranged to measure an angle or an angular displacement of the front wheels or the steering wheel or a detail connecting the steering wheel and the front wheels. As an alternative, or in combination with the above, second input data signal 12 may be provided by means of an accelerometer, a yaw rate sensor in combination with a velocity sensor, a GPS, or a camera. The second input data signal 12 may be provided by a combination of input data signals indicative of an actual performed, and/or on-going, and/or impending lateral position change of the vehicle hosting the system that may be provided by two or more sensor devices.

According to some embodiments, the processing means 7 is adapted to receive a third input data signal 13 indicative of a friction value between the vehicle hosting the system 6 and the ground on which the vehicle is travelling and/or a friction value of the ground in front of the vehicle. In such embodiments, the processing means 7 is adapted to process also the third input data signal 13 to thereby calculate the estimated vehicle path 17.

Thus, in such embodiments, an estimated vehicle path 17 may be displayed to the driver wherein the estimated vehicle path 17 at least partially is based on an estimation of a friction value. The displaying of the estimated vehicle path 17, containing this information regarding vehicle behavior and current road condition may significantly increase the safety of driving.

The third input data signal 13 may be provided by means of a sensor device or two or more sensor devices. The third input data signal 13 indicative of a friction value may be based on an estimation of a friction value. There are several ways of estimating a friction value between the vehicle hosting the system 6 and the ground on which the vehicle is travelling and/or a friction value of the ground in front of the vehicle. Such estimation methods may be classified as direct or indirect methods. Some methods that may be used in these embodiments are explained below and are to be interpreted as examples of methods that may be used in the present disclosure.

Some of the methods explained below can be found in the publication by IVSS, Intelligent Vehicle Safety Systems "Road Friction Estimation, part II", IVSS Project Report, M. Andersson, F. Bruzelius, J. Casselgren, M. Hjort, S. Lofving, G. Olsson, J. Ronnberg, M. Sjodal, S. Solyom, J. Svendenius, S. Yngve, Reference number: 2004:17750, Publication date: Nov. 10, 2010. This document may be found at http://www.ivss.se/upload/ivss_refll_slutrapport.pdf (available at Jan. 12, 2012).

In the methods and equations explained below, the x-direction corresponds to the longitudinal direction 1 of the vehicle 5, the y-direction corresponds to the lateral direction 3 of the vehicle 5 and the z-direction corresponds to a vertical direction of the vehicle 5.

Direct Methods:

Estimation of a friction value by estimation of tire forces during interventions of an anti-lock braking system (ABS) and/or a dynamic stability system and/or traction control system, using available vehicle dynamics information such as acceleration and vehicle mass, tire forces in x-, y- and z-direction may be estimated. The tire forces may be used to calculate a maximum friction value during an intervention, which maximum friction value may be used as an estimated friction value.

Estimation of a friction value by using the self-aligning torque Mz. A theoretical relation between the self-aligning torque Mz and tire forces may be used. This method is e.g. explained in the publication "Road Friction Estimation, part II".

Estimate the friction value by means of the longitudinal slip and estimated/calculated tire forces. A tire model, the brush model, may be used to model the tires of the vehicle. The brush model simplifies the tire and road contact patch as a brush. The model takes into consideration stiffness of the brush, tire forces and the slip, i.e. a ratio between a forward velocity of wheel and a forward velocity of vehicle. The slip and tire forces are measured and then the stiffness of the tire may be estimated and used to estimate the friction value. This method is e.g. explained in the publication "Road Friction Estimation, part II".

Tire mounted sensors such as strain gauges and accelerometers in order to estimate tire forces and a friction value.

A characteristic for indirect methods is that the friction itself is not estimated, but an indirect indicator, e.g. sound or optical characteristics.

Indirect methods:

Road surface classification using near infrared spectroscopy or camera which is coupled with a friction value. This method is e.g. explained in the publication "Road Friction Estimation, part II".

Tire mounted sensors such as strain gauges and accelerometers which estimates road surface textures which are coupled to a friction value.

Rain sensor, temperature sensor, wiper speed and similar parameters are used for confirming other friction estimations (not enough information to make a friction estimate on their own).

Road surface classification by analyzing the sound created in the tire to road contact patch which is coupled to a friction value.

V2I2V (vehicle-to-infrastructure-to-vehicle) and V2V (vehicle-to-vehicle) communication to get a road friction estimate made by e.g. other vehicles.

According to some embodiments, a combination of direct and indirect methods is used in order to obtain the third input data signal 13 indicative of a friction value. According to further embodiments, a combination of direct methods or a combination of indirect methods is used in order to obtain the third input data signal 13. Due to the combination of methods, a more reliable friction value may be obtained.

According to some embodiments, the display means 9 is further adapted to display an estimated vehicle stop distance 19 of the vehicle hosting the system 6. In such embodiments, the estimated vehicle stop distance 19 may be calculated by the processing means 7 processing at least the first, the second and the third input data signals 11, 12, 13 to thereby calculate an estimated vehicle stop distance 19. The estimated stop distance 19 may comprise an estimated stop zone that also may be displayed by the display means 9. As illustrated in FIG. 2, the estimated vehicle stop distance 19 may be displayed by the display means 9 in form of a number 21 and/or in a graphic form 23 indicating the estimated vehicle stop distance 19. The estimated vehicle stop distance 19 may be displayed by the display means 9 in the form of overlay graphics wherein the information may be presented such that the driver perceives where on the road ahead the vehicle is possible to be brought to a standstill. Consequently, such system may present information to the driver concerning the estimated vehicle stop distance 19 which may be intuitively perceived by the driver. This information provided to the driver may increase awareness of road friction and vehicle behaviour and its consequences and therefore improves the safety of the driving.

According to some embodiments, the display means 9 is further adapted to display an estimated minimum turning radius 27 of the vehicle hosting the system 6, as illustrated in FIG. 2. In such embodiments, the minimum turning radius 27 may be calculated by the processing means 7 processing at least the first, the second and the third input data signals 11, 12, 13 to thereby calculate a minimum turning radius 27. The minimum turning radius 27 may be displayed by the display means 9 in graphic form 25 indicating the minimum turning radius 27. The processing means may further be adapted to compare the minimum turning radius 27 with the estimated vehicle path 17 wherein the system 6 may be adapted to alert the driver if a difference between these is smaller than a predetermined threshold value.

The predetermined threshold value may further be dependent upon the velocity of the vehicle and/or other parameters. The alerting of the driver may be performed by means of indication symbol 31 and/or an indication sound and/or a haptic signal e.g. to the steering wheel. Further, the alerting of the driver may be in the form of a color coding of the estimated vehicle path 17. That is, the display means 9 may display the estimated vehicle path 17 in e.g. green color if the difference between the estimated minimum turning radius 27 and the estimated vehicle path 17 is greater than a predetermined value and in red color if the difference is smaller than a predetermined value. Further, the estimated vehicle path 17 may be displayed in yellow color if the difference is in a certain range. Thus, the minimum turning radius 27 may not be displayed per se, but be included in the displaying of the estimated vehicle path. Consequently, such system 6 may present information to the driver concerning the estimated minimum turning radius 27 which may be intuitively perceived by the driver.

As mentioned above, with at least the first, the second and the third input data signals 11, 12, 13 the processing means 7 may calculate an estimated vehicle path 17, an estimated vehicle stop distance 19 and an estimated minimum turning radius 27. When calculating these variables, the processing means 7 may also utilize other parameters such as vehicle acceleration, vehicle yaw rate, wheel base, track width, steering wheel ratio, ABS limitations, tire parameters, weight of the vehicle e.g. including weight of passengers and load, inertia of the vehicle, weight distribution, wind speed, slope of the road, banking of the road, driver reaction time, driver distraction, tiredness and fatigue. Further, properties of combined slip may be taken into consideration. Combined slip may be expressed as friction ellipse showing that the vehicle stop distance 19 and the minimum turning radius 27 has an influence on each other. That is, for a given friction value and vehicle velocity, the vehicle stop distance 19 becomes longer in case the vehicle is turning and the minimum turning radius 27 becomes longer in case the vehicle brakes or accelerates. When calculating an estimated vehicle path 17 and/or an estimated vehicle stop distance 19 and/or an estimated minimum turning radius 27, the processing means may be adapted to calculate these variables using vehicle dynamic equations. These equations may be based on vehicle parameters, vehicle dynamic parameters and driver parameters as mentioned above. Such equations are well known in the art. Simplified equations showing some principles of some of such equations are listed below.

For a given steering wheel angle, $\theta$, a steering wheel ratio, n, and a track width, s, a turning curvature, c, can be calculated assuming Ackermann-steering $$c = \frac{\sin(\theta/n)}{s}$$

A minimum turning radius, $r_{min}$, i.e. the most a vehicle can turn, for a given vehicle speed, $v_0$, and road friction coefficient, $\mu$, may be expressed as $$r_{min} = \frac{v_0^2}{\mu g}$$

with longitudinal acceleration assumed to be zero and limitations of wheel suspension not taken into consideration.

In the case that $r_{min}$ is less or equal to the turning radius, $1/c$, the driver will be able to follow the intended path. The available longitudinal acceleration, $a_x$, may then be determined as follows $$a_x = \sqrt{(\mu g)^2 - a_y^2}$$

The braking distance, $d_b$, may then be calculated, assuming linear deceleration $$d_b = \left(\frac{(v^2 - v_0^2)}{-2a_x}\right) + t_{reac} v_0 + d_{abs}$$

where $t_{reac}$ is the reaction time due to driver distraction, tiredness and fatigue of the driver and $d_{abs}$ is the additional braking distance due to a not ideal ABS system.

To visualize the braking distance in a fixed cartesian-coordinate system, a bicycle model of the vehicle may be used and the following equations can be obtained:

$$x = 0:0.05: \frac{1}{c} - \cos(d_b c)\frac{1}{c}$$

$$y = \sqrt{\left(\frac{1}{c}\right)^2 - \left(x - \frac{1}{c}\right)^2}$$

x is the lateral position and y is the longitudinal position.

As with the minimum possible turning radius, the properties of combined slip are used, leading to the fact that the braking distance increases with steering wheel angle and vice versa.

Simplified vehicle and tire model have been used in the above equations. No dynamics of the vehicle have been taken into consideration. The equations are only showing the principles behind the disclosure.

According to some embodiments, the processing means 7 is adapted to receive a fourth input data signal 14 indicative of an extension of a road 29 in front of the vehicle hosting the system 6. In such embodiments, the fourth input data signal 14 may be provided by means of a sensor device. The sensor device may be a camera system utilizing a camera 8 and/or a positioning system, such as a GPS forming part of a navigation system and/or a radar system and/or a sonar system and/or an ultra sound system and/or a LIDAR (Light Detecting And Ranging) system.

According to some embodiments, the processing means 7 is adapted to compare the extension of the road 29 with the estimated vehicle path 17 and wherein the driver assisting system 6 is adapted to alert the driver if a difference between the estimated vehicle path 17 and the extension of the road 29 exceeds a predetermined threshold value. Thus, the difference between the estimated vehicle path 17 and the extension of the road 29 may indicate a severity of a driving situation and the alerting of the driver in case the difference between the estimated vehicle path 17 and the extension of the road 29 exceeds a predetermined threshold value may significantly increase the safety of driving. According to some embodiments, the alerting of the driver is in the form of a color coding of the displaying of the estimated vehicle path 17. That is, the display means 9 may display the estimated vehicle path 17 in e.g. green color if the difference between the estimated vehicle path 17 and the extension of the road 29 is smaller than a predetermined value and in red color if the difference is greater than a predetermined value. Further, the estimated vehicle path 17 may be displayed in yellow color if the difference is in a certain range. Also, the color coding of the estimated vehicle path 17 may be performed in an incremental manner such that the color of the estimated vehicle path 17 is shifted dependent of a comparison between the estimated vehicle path 17 and the extension of the road 29. Further, the alerting of the driver may be performed by means of indication symbol 31 and/or an indication sound and/or a haptic signal. Thus, the system 6 may provide information to a driver of the vehicle concerning a driving situation that may be intuitively perceived by the driver and may therefore significantly increases the safety of driving.

According to some embodiments, the processing means 7 is adapted compare the estimated minimum turning radius 27 with the fourth input data signal 14 indicative of an extension of the road 29 in front of the vehicle hosting the system 6, wherein the driver assisting system 6 is adapted to alert the driver if a difference between the estimated minimum turning radius 27 and the fourth input data signal 14 is smaller than a predetermined threshold value. Also in these embodiments, the alerting of the driver may be performed in the form of a color coding in the displaying of the estimated vehicle path 17.

Figure 3:
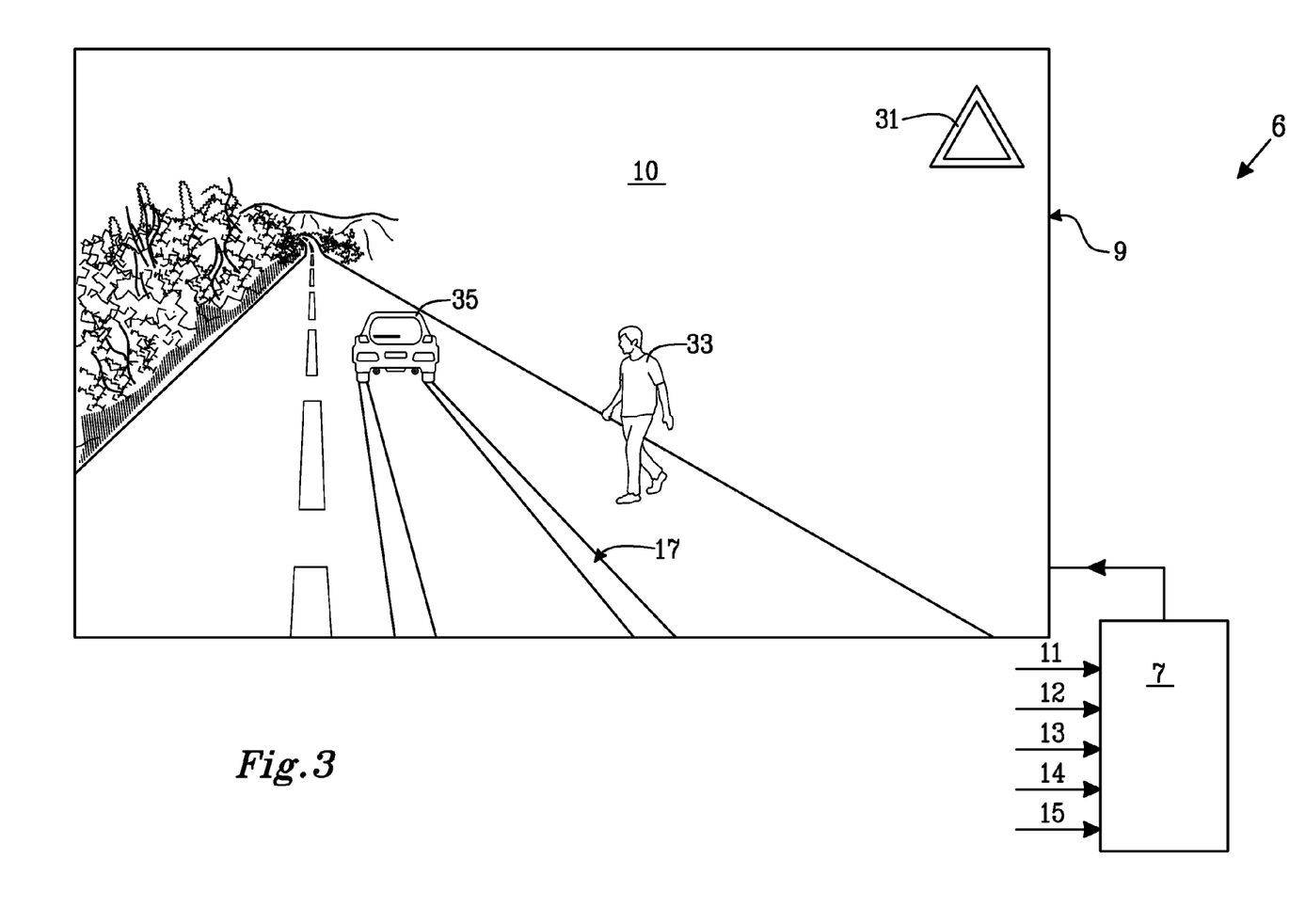
FIG. 3 illustrates the driver assisting system for a vehicle as illustrated in FIG. 2, in a different driving situation.

FIG. 3 illustrates the driver assisting system 6 for a vehicle as illustrated in FIG. 2, in a different driving situation. According to some embodiments, the processing means is adapted to receive a fifth input data signal 15 indicative of the presence of external objects in front and/or to the side of the vehicle hosting the system. Such external object may be a pedestrian 33, an automobile 35, an animal, an intersection, a road sign, or any other external object that may constitute a threat to the safety of driving. The fifth input data signal 15 may be provided by a sensor device such as a camera system utilizing a camera 8, e.g. an infra-red camera and/or a radar system and/or a GPS forming part of a navigation system and/or a radar system and/or a sonar system and/or an ultra sound system and/or a LIDAR (Light Detecting And Ranging) system and or a communication device communicating with a base station and/or another vehicle.

According to some embodiments, the processing means is adapted to compare the estimated vehicle path 17 with the fifth input data signal 15 representing external objects 33, 35 in front of the vehicle and wherein the driver assisting system 6 is adapted to alert the driver if a distance between the estimated vehicle path 17 and the external object 33, 35 is lower than a predetermined threshold value. Thus, the distance between the estimated vehicle path 17 and the fifth input data signal 15 representing external objects 33, 35 in front of the vehicle may indicate a severity of a driving situation. According to some embodiments, the alerting of the driver is in the form of a color coding of the displaying of the estimated vehicle path 17. That is, the display means 9 may display the estimated vehicle path 17 in e.g. green color if the distance between the estimated vehicle path 17 and an external object 33, 35 is greater than a predetermined value and in red color if the distance is smaller than a predetermined threshold value. Further, the estimated vehicle path 17 may be displayed in yellow color if the distance is within a certain range. Also, the color coding of the estimated vehicle path 17 may be performed in an incremental manner such that the color of the estimated vehicle path 17 is shifted dependent of a comparison between the estimated vehicle path 17 and an external object 33, 35. Further, the alerting of the driver may be performed by means of indication symbol 31 and/or an indication sound. Thus, the system 6 may provide information to a driver of the vehicle concerning a driving situation that may be intuitively perceived by the driver.

The fifth input data signal 15 representing external objects 33, 35 in front of the vehicle may further comprise a velocity of the external object 33, 35. That is, in case the external object is a vehicle 35 on the road in front of the vehicle hosting the system, the fifth input data signal 15 may comprise a velocity of that vehicle 35. Thus, the driver assisting system 6 may be adapted to alert the driver if a position, velocity and distance of the vehicle 35 ahead is considered to pose a threat to the safety of driving in a current driving situation and thus also alert the driver if a vehicle 35 ahead is driving with a lower velocity than the a velocity of the vehicle hosting the system 6. In case the external object is a pedestrian 33 or an animal approaching from the side of the road, the fifth input data signal 15 may comprise a velocity of the pedestrian 33 or animal. In the comparison between the estimated vehicle path 17 and the fifth input data signal 15, the processing means 7 may be adapted to compare the position and velocity of an external object 33, 35 with the estimated vehicle path 17 to thereby judge the severity of a driving situation. In embodiments discussed, the processing means 7 may be adapted to process the first, the second, and the third input data signals 11, 12, 13 to thereby calculate the estimated vehicle path 17. In such embodiments, a comparison between the estimated vehicle path 17 with the fifth input data signal 15 representing external objects 33, 35 in front of the vehicle includes a friction value. Thus, the driver assisting system may alert the driver about an upcoming critical situation partially based on a friction value and thereby enhance the safety of driving.

According to some embodiments, the driver assisting system 6 may be adapted to compare the fifth input data signal 15 representing external objects 33, 35 in front of the vehicle with the estimated vehicle stop distance 19. In such embodiments, the driver assisting system 6 may alert the driver if a difference between the fifth input data signal 15 and the estimated vehicle stop distance 19 is smaller than a predetermined threshold value.

Further, the driver assisting system 6 may be adapted to display an external object 33, 35 using the display means 9. The displaying of an external object may be color coded in a similar manner as the estimated vehicle path 17. That is, if an external object 33, 35 is considered to constitute a danger to the safety of driving, the external object may be displayed in red color and so on. The displaying of an external object 33, 35 may improve detection of the object, especially in case of bad weather and/or darkness, to thereby improve the safety of driving.

In embodiments discussed, the predetermined threshold values used may be variable and dependent upon factors such as vehicle velocity, driver reaction time, the drivers driving behaviour, the drivers tiredness and/or fatigue, an actual performed and/or on-going and/or impending lateral position change of the vehicle, a friction value between the vehicle hosting the system and the ground on which the vehicle is traveling and/or a friction value of the ground in front of the vehicle. In combination with the above mentioned, or as an alternative, the predetermined threshold values may be manually chosen by the driver via a setting in a menu system.

Figure 4:
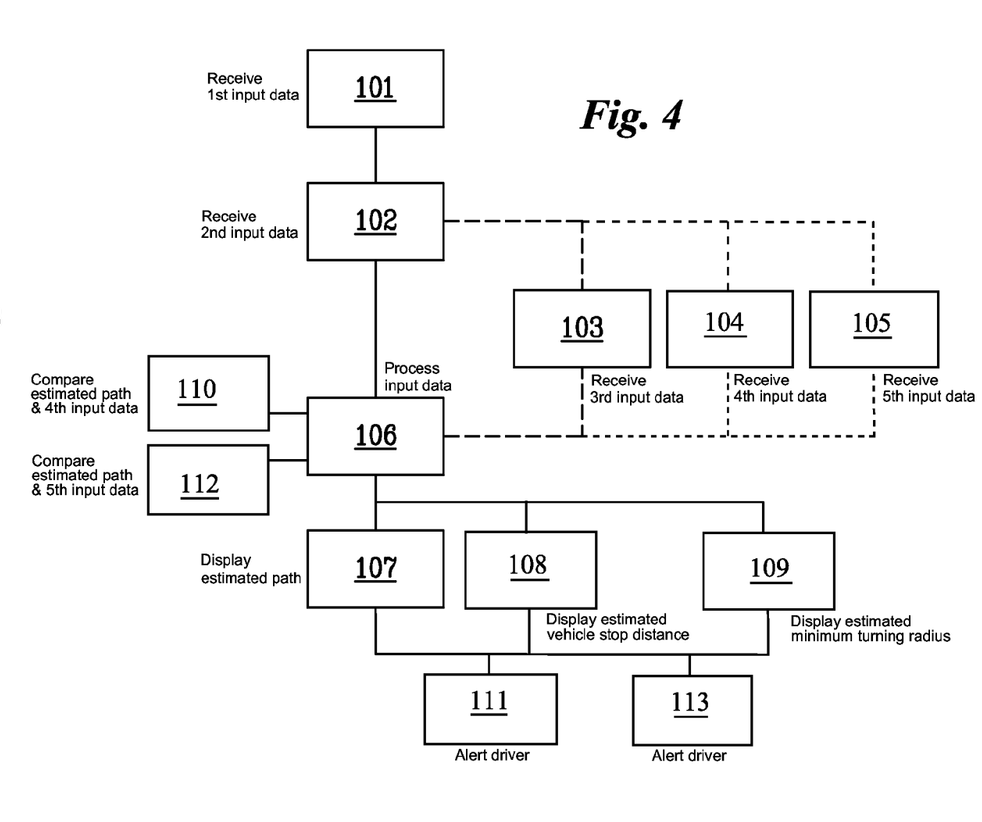
FIG. 4 illustrates a method of assisting a driver of a vehicle.

FIG. 4 illustrates a method of assisting a driver of a vehicle using a processing means and a display means. The display means is adapted to display information on a screen of a vehicle hosting the system. The screen further being adapted to present the environment in front of the vehicle, and/or a representation of the environment in front of the vehicle. The vehicle extends in a longitudinal direction and a lateral direction, wherein the longitudinal direction corresponds to the intended direction of travel of the vehicle. The method comprises;

receiving 101 in the processing means a first input data signal indicative of a velocity of the vehicle hosting the system, and receiving 102 in the processing means a second input data signal indicative of an actual performed and/or on-going and/or impending lateral position change of the vehicle hosting the system, and processing 106 at least the first and the second input data signals, using the processing means, to thereby calculate an estimated vehicle path of the vehicle hosting the system, and displaying 107 the estimated vehicle path on the screen using the display means.

Since the estimated vehicle path is displayed to a driver via the display means, the driver's awareness of vehicle behaviour and its consequences is increased. As a result, the above mentioned object is achieved.

The method of assisting a driver of a vehicle may further comprise;

receiving 103 in the processing means a third input data signal indicative of a friction value between the vehicle hosting the system and the ground on which the vehicle is travelling and/or a friction value of the ground in front of the vehicle, and processing 106 also the third input data signal, using the processing means, to thereby calculate the estimated vehicle path.

Thus, in such embodiments, an estimated vehicle path may be presented to the driver at least partially based on information concerning a friction value. Thus, the method provided may enhance the safety of driving.

The method of assisting a driver of a vehicle may further comprise;

displaying 108 an estimated vehicle stop distance of the vehicle hosting the system on the screen using the display means.

In such embodiments, at least the first and the second input data signals may be processed, and in further embodiments also the third input data signal may be processed using the processing means to thereby calculate the estimated vehicle stop distance.

The method of assisting a driver of a vehicle may further comprise;

displaying 109 an estimated minimum turning radius of the vehicle hosting the system on the screen using the display means.

In such embodiments, at least the first and the second input data signals may be processed, and in further embodiments also the third input data signal may be processed using the processing means to thereby calculate the estimated minimum turning radius.

The method of assisting a driver of a vehicle may further comprise;

receiving 104 in the processing means a fourth input data indicative of an extension of a road in front of the vehicle hosting the system.

The method of assisting a driver of a vehicle may further comprise;

comparing 110 the estimated vehicle path with the fourth input data signal indicative of the extension of the road using the processing means and, alerting 111 the driver if a difference between the estimated vehicle path and the road extension exceeds a predetermined threshold value.

The method of assisting a driver of a vehicle may further comprise;

receiving 105 in the processing means a fifth input data indicative of the presence of external objects in front and/or to the side of the vehicle hosting the system.

The method of assisting a driver of a vehicle may further comprise;

comparing 112 the estimated vehicle path with the fifth input data signal representing external objects in front of the vehicle and, alerting 113 the driver if a distance between the estimated vehicle path and the external object is lower than a predetermined threshold value.

According to some embodiments, in the method of assisting a driver of a vehicle, the screen is a windscreen of the vehicle hosting the system.

According to some embodiments, in the method of assisting a driver of a vehicle, the display means comprises a screen showing an image of the road in front of the vehicle captured by a camera.

According to some embodiments, in the method of assisting a driver of a vehicle, the display means comprises a screen showing a navigation image of the road in front of the vehicle.

As stated above, the display means may be adapted to display the estimated vehicle path such that the driver perceives that the displaying is made on the road in front of the vehicle. In embodiments wherein the display means comprises a head up display system, the driver assisting system may comprise eye sensing and/or head sensing devices allowing estimation of eye location. The estimation of eye and/or head location may be achieved through a number of methods. For example, the driver may use a calibration routine upon entering the vehicle to align graphics in a process similar to adjusting rear view mirrors. Further, seat position longitudinally in the vehicle may be used to estimate a position of the drivers head. Also, manual adjustment of a rear view mirror or mirrors may be used to estimate location of the driver's eyes. A combination of methods may be used, for example, seat position and mirror adjustment angle may be utilized to estimate driver head position with improved accuracy.

As mention above, the alerting of the driver may be performed using color coding of the estimated vehicle path. As an alternative, other methods may be used such as contrast shading, sound signals, or any other method capable of alerting the driver about an upcoming critical situation.

According to some embodiments, the estimated vehicle stop distance is calculated by the processing means processing at least the first and the second input data signals to thereby calculate an estimated vehicle stop distance. Thus, in these embodiments, a conversion table may be used wherein a velocity of the vehicle corresponds to an estimated vehicle stop distance. Further, in all the embodiments related to a vehicle stop distance being calculated, a correction may be used wherein the processing means is adapted to receive a sixth input data signal indicative of an longitudinal acceleration of the vehicle wherein the processing means is adapted to process also the sixth input data signal to thereby calculate the estimated vehicle stop distance. According to further embodiments, processing means is adapted to process the sixth input data signal indicative of an longitudinal acceleration of the vehicle to thereby calculate an vehicle stop distance based on the longitudinal acceleration of the vehicle and wherein the display means is adapted to display the vehicle stop distance based on the longitudinal acceleration of the vehicle on the screen. In such embodiments, the vehicle stop distance based on the longitudinal acceleration of the vehicle may be displayed to a driver of the vehicle such that the driver understands that the vehicle stop distance being displayed represents an estimated vehicle stop distance based on a current longitudinal acceleration of the vehicle. It is to be understood that a negative longitudinally acceleration corresponds to a retardation of the vehicle.

Although the disclosure has been described with reference to example embodiments, many different alterations, modifications and the like will become apparent for those skilled in the art. For instance, the driver assisting system may be adapted to also perform safety preventive measures, other than, or together with the alerting the driver, such as seat belt tightening, throttle idling, automatic braking, air bag preparation, adjustment to head restrains, horn and/or head light activation, haptic signals, adjustment to pedals or the steering column, adjustment to suspension control, and adjustments to stability control system of the vehicle. Thus, the driver assisting system may perform such safety preventive measures e.g. when the difference between the estimated vehicle path and the extension of the road exceeds a predetermined threshold value and/or if the distance between the estimated vehicle path and the external object is lower than a predetermined threshold value.

It is understood by those skilled in the art that the processing means 7 may be adapted to receive the first, the second, the third, the fourth and the fifth input data signals 11, 12, 13, 14, 15 in any suitable order. Likewise, in the methods described herein, the receiving steps 101, 102, 103, 104, 105 in the processing means of the first, the second, the third, the fourth and the fifth input data signals may be performed in any order.

It is also to be understood that the foregoing is illustrative of various example embodiments and the disclosure is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

As used herein, the term "and/or" includes any and all combinations of one or more of the associated listed items.

As used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

The terminology used herein is for the purpose of describing particular embodiments only and is not intended to be limiting. As used herein, the singular forms "a", "an" and "the" are intended to include the plural forms as well, unless the context clearly indicates otherwise.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A driver assisting system for a vehicle, said system comprising:
   a processing means; and
   a display means, said display means being adapted to display information on a screen of a vehicle hosting said system, said screen further being adapted to show the environment in front of the vehicle or a representation of the environment in front of the vehicle,
   wherein said vehicle extends in a longitudinal direction and a lateral direction, and wherein said longitudinal direction corresponds to the intended direction of travel of said vehicle,
   wherein said processing means is adapted to receive a first input data signal indicative of a velocity of said vehicle hosting said system, and a second input data signal indicative of an actual performed, on-going or impending lateral position change of said vehicle hosting said system, the processing means further being adapted to process at least the first and the second input data signals to thereby calculate an estimated vehicle path of said vehicle hosting said system, said display means being adapted to display said estimated vehicle path on said screen, and wherein said processing means is adapted to receive a third input data signal indicative of a friction value between said vehicle hosting said system and the ground on which said vehicle is traveling and a friction value of the ground in front of said vehicle, wherein the friction values indicated by the third input data signal are determined based on a combination of an estimated direct friction value and an estimated indirect friction value, the estimated indirect friction value based on a road surface classification, and wherein the processing means is adapted to process also said third input data signal to thereby calculate said estimated vehicle path based on the velocity, lateral position change, and friction values indicated by the first, second and third input signals.

2. The driver assisting system according to claim 1, wherein said display means further is adapted to display an estimated vehicle stop distance of said vehicle hosting said system.

3. The driver assisting system according to claim 1, wherein said display means further is adapted to display an estimated minimum turning radius of said vehicle hosting said system.

4. The driver assisting system according to claim 1 wherein said processing means is adapted to receive a fourth input data signal indicative of an extension of a road in front of said vehicle hosting said system.

5. The driver assisting system according to claim 4, wherein the processing means is adapted to compare the estimated vehicle path with the fourth input data signal indicative of the extension of the road and wherein the driver assisting system is adapted to alert the driver if a difference between the estimated vehicle path and the extension of the road exceeds a predetermined threshold value.

6. The driver assisting system according to claim 5, wherein the alerting of the driver is in the form of a color coding of the displaying of the estimated vehicle path.

7. The driver assisting system according to claim 1, wherein the processing means is adapted to receive a fifth input data signal indicative of the presence of external objects in front and/or to the side of said vehicle hosting said system.

8. The driver assisting system according to claim 7, wherein the processing means is adapted to compare the estimated vehicle path with the fifth input data signal representing external objects in front of the vehicle and wherein the driver assisting system is adapted to alert the driver if a distance between the estimated vehicle path and the external object is lower than a predetermined threshold value.

9. The driver assisting system according to claim 1, wherein said screen is a windscreen of said vehicle hosting said system.

10. The driver assisting system according to claim 1, wherein the display means comprises a screen showing an image of the road in front of the vehicle captured by a camera.

11. The driver assisting system according to claim 1, wherein the display means comprises a screen showing a navigation image of the road in front of the vehicle.

12. The driver assisting system of claim 1 wherein the estimated indirect friction value is further based on a communication received by the host vehicle that includes a friction estimate made by another vehicle.

13. A method of assisting a driver of a vehicle using a processing means and a display means wherein said display means is adapted to display information on a screen of a vehicle hosting said system, said screen further being adapted to present the environment in front of the vehicle or a representation of the environment in front of the vehicle, wherein said vehicle extends in a longitudinal direction and a lateral direction, and wherein said longitudinal direction corresponds to the intended direction of travel of said vehicle, the method comprising:

receiving in said processing means a first input data signal indicative of a velocity of said vehicle hosting said system;

receiving in said processing means a second input data signal indicative of an actual performed, on-going or impending lateral position change of said vehicle hosting said system;

receiving in said processing means a third input data signal indicative of a friction value between said vehicle hosting said system and the ground on which said vehicle is traveling and a friction value of the ground in front of said vehicle, wherein the friction values indicated by the third input data signal are determined based on a combination of an estimated direct friction value and an estimated indirect friction value, the estimated indirect friction value based on a road surface classification;

processing at least the first and the second and the third input data signals, using the processing means, to thereby calculate an estimated vehicle path of said vehicle hosting said system; and displaying said estimated vehicle path on said screen using said display means.

14. The driver assisting method of claim 13 wherein the estimated indirect friction value is further based on a communication received by the host vehicle that includes a friction estimate made by another vehicle.

15. A driver assisting system for a vehicle, the system comprising:

a processor adapted to receive a first input data signal indicative of a velocity of the vehicle, a second input data signal indicative of an actual performed, on-going or impending lateral position change of the vehicle, and a third input data signal indicative of a friction value between said vehicle hosting said system and the ground on which said vehicle is traveling and a friction value of the ground in front of said vehicle, the friction values indicated by the third input data signal determined based on a combination of an estimated direct friction value and an estimated indirect friction value, and to process at least the first, second and third input data signals to thereby calculate an estimated path of the vehicle; and a display system adapted to display an environment in front of the vehicle or a representation of the environment in front of the vehicle, the display system further adapted to display the estimated vehicle path calculated by the processor.

16. The driver assisting system of claim 15, wherein the processor is adapted to compare the estimated vehicle path with a further input data signal indicative of an extension of a road in front of the vehicle, and wherein the processor and/or the display system is/are further adapted for use in providing an alert to the driver if a difference between the estimated vehicle path and the extension of the road exceeds a predetermined threshold value.

17. The driver assisting system of claim 15, wherein the processor is adapted to compare the estimated vehicle path with a further input data signal indicative of a presence of an external object in front and/or to the side of the vehicle, and wherein the processor and/or the display system is/are further adapted for use in providing an alert to the driver if a distance between the estimated vehicle path and the external object is lower than a predetermined threshold value.

18. The driver assisting system of claim 17, wherein the display system is adapted to display an image of a road in front of the vehicle captured by a camera.

19. The driver assisting system of claim 15, wherein the display system is adapted to display a navigation image of a road in front of the vehicle.

20. The driver assisting system of claim 15 wherein the estimated indirect friction value is further based on a communication received by the host vehicle that includes a friction estimate made by another vehicle.

* * * * *